Patented Nov. 8, 1932

1,886,809

UNITED STATES PATENT OFFICE

FRITZ HESS, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

ARYLATED SAFRANINES AND PROCESS OF PREPARING THEM

No Drawing. Application filed August 18, 1930, Serial No. 476,244, and in Germany September 4, 1929.

The present invention relates to arylated safranines and process of preparing them.

The manufacture of arylated safranines by synthesis is known. Hitherto, it has not been possible, however, to prepare arylated safranines by the well-known arylating process, that is by melting arylamines or their hydrochlorides with safranines; this operation, according to the safranines used, yields either induline-like bodies or dull, unsightly and ill defined decomposition products of safranines.

According to this invention, it is possible to arylate safranines quite generally, for instance, to transform safranines which are alkylated in an amino-group and correspond with the formula:

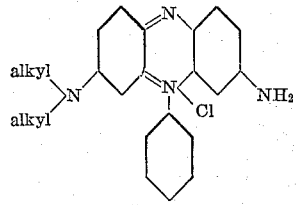

into aryl-alkyl-safranines of the following general formula:

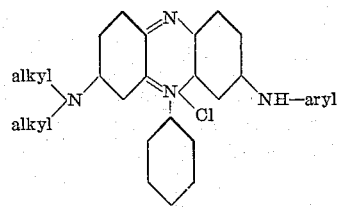

or phenosafranines of the type

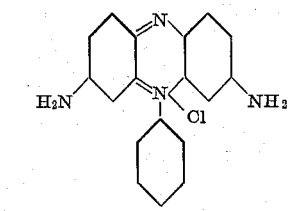

into the corresponding diarylsafranines of the following general formula:

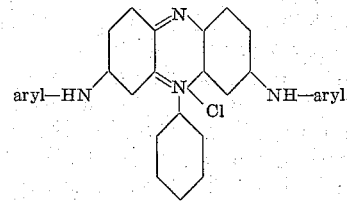

The reaction may easily be carried out if, instead of starting from the dyestuffs, the corresponding leuco-compounds are arylated and, if necessary, oxidized to the dyestuffs. It is not necessary to isolate the leuco-compounds. The safranine is dissolved in an excess of the arylating agent or in another suitable solvent as, for instance, phenol. The hydrochloride of the arylating agent is added to the solution, the safranine is reduced to the leuco compound by means of a metallic reducing agent as, for instance, iron or zinc dust, and by heating for instance to 90° C.–170° C. The leuco compound is arylated by heating the mixture to about 180° C.–260° C. When the reaction is finished, the reducing agent is eliminated and the solution of the arylated leuco-compound is oxidized to the dyestuff, for instance, by means of air; the dyestuff is then isolated by removing the solvent according to one of the known methods. By varying the components, homologues and substitution products of safranines, which are arylated at one or both amino-groups, are easily obtained, including a series of hitherto unknown dyestuffs of the following formula:

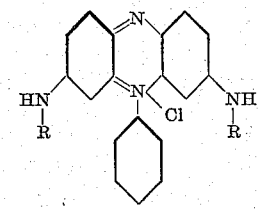

wherein

R stands for a naphthalene radical or a substituted benzene radical,

A considerable technical advantage of the process resides in the fact that the reduction of the dyestuff to the leuco-compound and the arylation may be carried out in a single operation.

The dyestuffs thus obtained dye silk and tanned cotton fine violet to sky-blue tints of good properties of fastness. In contrast with the indulines, the dyestuffs dissolve in concentrated sulfuric acid not to a blue but to a green solution characteristic of safranines, which solution becomes blue when diluted with water. By treating the dyestuffs with sulfonating agents, acid dyestuffs are obtained, which dye silk and cotton similar tints.

The following examples serve to illustrate the invention, but they are not intended to limit it thereto; the parts are by weight:

(1) 10 parts of phenosafranine are dissolved at 130° C. in 150 parts of aniline; 10 parts of dry hydrochloride of aniline are added, and 8 parts of zinc dust are added in portions, until the deep red color has been superseded by yellow. During the reduction the temperature rises by about 15° C.–20° C. The whole is then boiled in a reflux apparatus. The course of the reaction is illustrated by the following formulæ:

2000 parts of water and 200 parts of hydrochloric acid of 30 per cent strength. The excess of the oil dissolves; the dyestuff which separates in the form of dark blue flakes having a bronze-like shimmer, is filtered and dried at 60° C.–70° C. There are obtained 12 parts of diphenylphenosafranine. A part of the excess of aniline is recovered by adding lime to the filtrate and treating with steam.

(2) 10 parts of diethylsafranine are dissolved in 75 parts of aniline at water bath temperature, 5 parts of aniline hydrochloride are added, the temperature is raised to 150° C., and 8 parts of zinc dust are cautiously strewn in. The violet color of the solution becomes brownish-yellow. The solution is heated in a reflux apparatus to the boiling point of aniline until the color of a test portion of the mixture no longer changes towards blue when exposed to the air, which generally is the case after three-quarters of an hour. The mass is then cooled and mixed with 50–100 parts of alcohol, filtered in order to separate the excess of zinc dust and a small quantity of aniline zinc chloride which has been precipitated. The oxidation of the solution, which already becomes very blue during the filtration, is finished by passing air through the filtrate. After the alcohol has been distilled off, the dyestuff is precipitated by pouring the solution into a mixture of 500

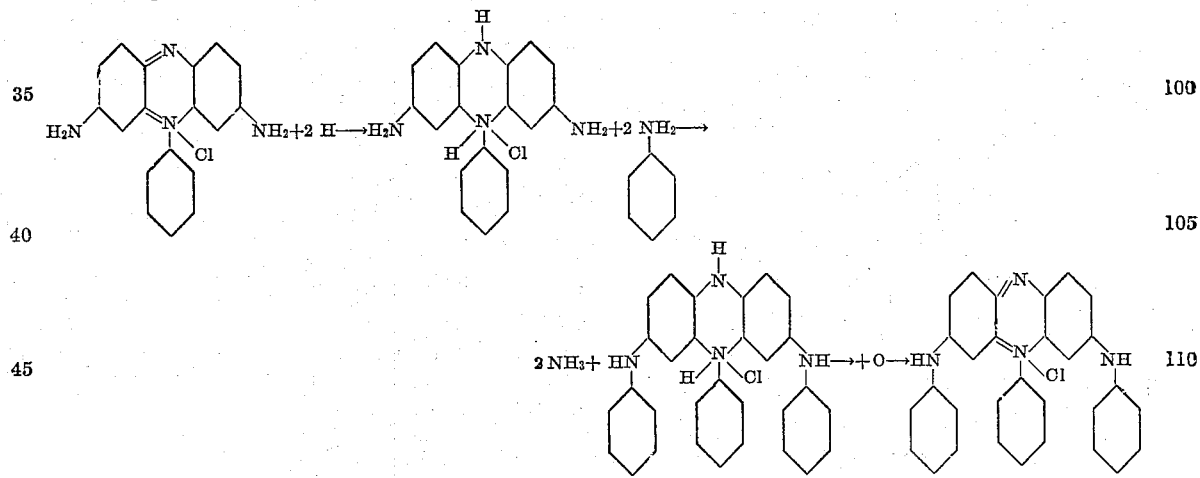

During the boiling operation, the progress of the arylation is ascertained by taking from time to time a test sample of the boiling solution which sample is oxidized to the dyestuff in the air, at once. As the arylation proceeds, the color of the test sample is at first red, then reddish-violet, then bluish-violet and finally blue. Heating is continued until the blue color no longer changes, whereupon boiling is interrupted. The solution is then cooled to 140° C.–150° C. and filtered in order to separate the zinc dust, during which operation oxidation to the dyestuff already begins. A current of air is passed through the filtrate for about 10 minutes, and the deep blue solution is then poured into a mixture of parts of water and 100 parts of hydrochloric acid of 30 per cent strength. The dyestuff is filtered and dried at 70° C.–80° C. 8–10 parts of the new safranine of the following formula

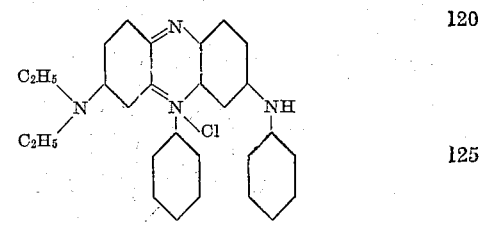

are thus obtained.

(3) 10 parts of phenosafranine are dissolved at water bath temperature in 75 parts of paratoluidine, 5 parts of paratoluidine hydrochloride are added, the temperature is raised to 140° C., and 10 parts of zinc dust are strewn in. The red color of the solution becomes yellow. The whole is subsequently heated in a reflux apparatus to the boiling point of the toluidine, whereby the solution assumes a blue coloration. After about 30 minutes, the reaction is finished and the mass is subsequently treated as described in Example 2. There are obtained 12–14 parts of di-para-tolylphenosafranine of the following formula

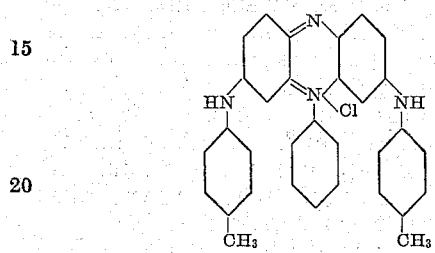

The arylation occurs in an analogous manner when for instance parachloraniline, paraphenetidine or 1.2-dimethyl-4-aminobenzene is used.

(4) 10 parts of phenosafranine are dissolved in 75 parts of α-naphthylamine at water bath temperature, 7 parts of hydrochloride of α-naphthylamine are added, and the whole is subsequently reduced by means of 8 parts of zinc dust at about 160° C. The yellow solution is heated to about 230° C.–240° C., until the solution has assumed its bluest coloration. It is then cooled to about 70° C., mixed with 100 parts of alcohol and filtered; the filtrate is oxidized by means of air, the alcohol is removed by distillation, and the dyestuff is then precipitated by pouring the solution into a hot mixture of 1000 parts of water and 100 parts of hydrochloric acid of 30 per cent strength. It is necessary, because of the relatively low solubility of the naphthylamine, to extract once more the filtered dyestuff with warm diluted hydrochloric acid. 14 parts of dinaphthylated safranine of the following formula

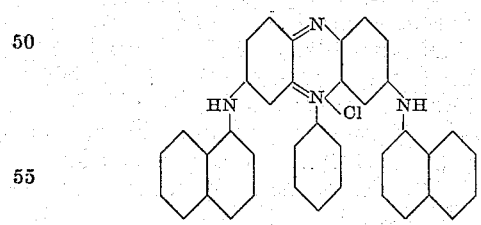

are obtained.

(5) 10 parts of phenosafranine are dissolved in 50 parts of molten phenol at 100° C. and reduced to the leuco-compound by strewing in 8 parts of zinc dust at 150° C.–160° C. The whole is heated to 180° C. for 1½ hours while adding 8 parts of para-phenylenediamine and 3 parts of para-phenylenediamine hydrochloride. After cooling to 50° C., 100 parts of alcohol are added to the solution, which is then filtered in order to separate the excess of zinc dust. Air is blown through the solution whereby the aryl-leuco-compound, which has been formed, is oxidized to the dyestuff. After the alcohol has been distilled off, the solution of the phenol and the dyestuff is run into 700 parts of ice-water and 60 parts of a solution of caustic soda of 30 per cent strength. The phenol dissolves; the base of the dyestuff precipitates. It is filtered and extracted with dilute hydrochloric acid at 50° C.–60° C. There remains a small amount of a sparingly soluble blue dyestuff. Common salt is added to the blue acid filtrates, whereby the para-para'-diamino-diphenylenephenosafranine percipitates. 10,3 parts of the new dyestuff of the following formula:

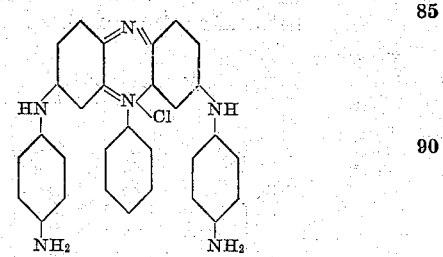

are thus obtained.

(6) By using instead of para-phenylenediamine meta-phenylenediamine, the reaction occurs in an analogous manner. From 10 parts of phenosafranine, 10 parts of meta-diaminodiphenylenephenosafranine of the following formula

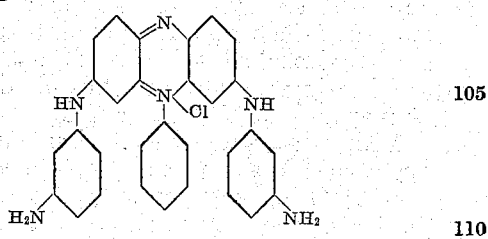

are obtained.

(7) 10 parts of phenosafranine are dissolved in 60 parts of molten phenol at 100° C., reduced at 160° C. with 8 parts of zinc dust and heated for one hour at 180° C., while adding 8,6 parts of meta-toluylenediamine. The mass is worked up as indicated in Example 5. 10,6 parts of meta-diamino-ditolyl-phenosafranine of the following formula

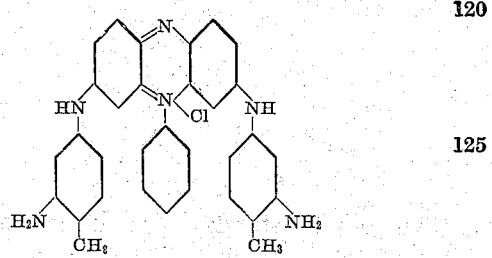

are obtained.

(8) 10 parts of phenosafranine are dissolved in 50 parts of ortho-toluidine at about 100° C. The whole is heated to 160° C.-170° C., and a mixture of 5 parts of ortho-toluidine hydrochloride and 5 parts of zinc dust is added in portions. The red color of the solution becomes feebly yellow whereupon the ortho-toluidine is heated to boiling in a reflux apparatus. The arylation is finished after about 25-30 hours. The mass is cooled to about 70° C. and mixed with 150 parts of alcohol; the whole is then filtered in order to separate the excess of zinc dust; the filtrate becomes blue on exposure to the air. After the alcohol has been distilled, the solution of toluidine and the dyestuff is poured into 1000 parts of water and 70 parts of hydrochloric acid of 30 per cent. strength. The toluidine dissolves; the dyestuff precipitates and is filtered and dried. 15 parts of ortho-ortho'-ditolylphenosafranine of the following formula

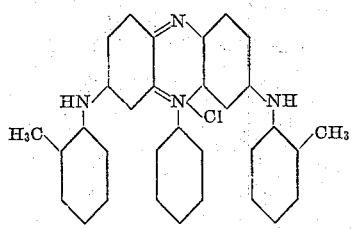

are obtained.

I claim:

1. The process which comprises causing a metallic reducing agent of the group consisting of iron and zinc, while heating, to act upon a phenosafranine in the presence of an arylamine of the group consisting of primary amines of the benzene and naphthalene series and a hydrochloric acid salt of the same amine and heating the mixture thus obtained at a temperature of 180° C.-260° C.

2. The process which comprises causing zinc dust, while heating at a temperature of 90° C.-170° C., to act upon a phenosafranine in the presence of an arylamine of the group consisting of primary amines of the benzene and naphthalene series and a hydrochloric acid salt of the same amine and heating the mixture thus obtained at a temperature of 180° C.-260° C.

3. The process which comprises causing zinc dust, while heating at a temperature of 90° C.-170° C. to act upon phenosafranine in the presence of an amine of the following formula

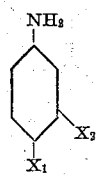

wherein $X_1$ stands for hydrogen, methyl or amino and $X_2$ for hydrogen or amino, and a hydrochloric acid salt of the same amine and heating the mixture thus obtained at a temperature of 180° C.-260° C.

4. The process which comprises causing zinc dust, while heating at a temperature of 90° C.-170° C., to act upon phenosafranine in the presence of an amine of the following formula

wherein $X_1$ stands for hydrogen, methyl or amino, and a hydrochloric acid salt of the same amine and heating the mixture thus obtained at a temperature of 180° C.-260° C.

5. The process which comprises treating phenosafranine at 140° C. with zinc dust in the presence of p-toluidine and p-toluidine hydrochloride and further heating the mixture thus obtained at boil temperature.

6. The process which comprises treating phenosafranine at 160° C. with zinc dust in the presence of α-naphthylamine and α-naphthylamine hydrochloride and further heating the mixture thus obtained at 230° C.-240° C.

7. The process which comprises treating phenosafranine at 150° C.-160° C. with zinc dust in the presence of p-phenylenediamine and p-phenylenediamine hydrochloride and further heating the mixture thus obtained at 180° C.

8. As new products, the compounds of the following formula

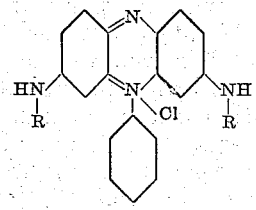

wherein R stands for a naphthalene radical or a benzene radical which is substituted by at least one substituent of the group consisting of methyl, amino, ethoxy and chloro, dissolving in concentrated sulfuric acid to a green solution, the color of which turns blue when diluted with water and from which solution there are precipitated, on addition of alkali, the dyestuff bases soluble in ethyl-alcohol, ether and benzene to a blue solution.

9. As new products, the compounds of the following formula

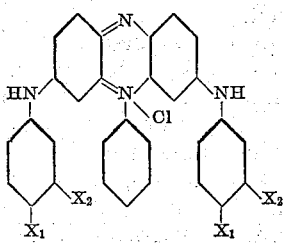

wherein $X_1$ stands for $CH_3$, $NH_2$, Cl or $OC_2H_5$ and $X_2$ stands for hydrogen, or $X_1$ stands for $CH_3$ or hydrogen and $X_2$ stands for $CH_3$ or $NH_2$, dissolving in concentrated sulfuric acid to a green solution, the color of which turns blue when diluted with water and from which solution there are precipitated, on addition of alkali, the dyestuff bases soluble in ethylalcohol, ether and benzene to a blue solution.

10. As new products, the compounds of the following formula

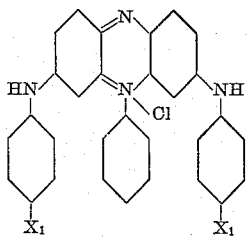

wherein $X_1$ stands for methyl or amino, dissolving in concentrated surfuric acid to a green solution, the color of which turns blue when diluted with water and from which solution there are precipitated, on addition of alkali, the dyestuff bases, soluble in ethylalcohol, ether and benzene to a blue solution.

11. As a new product, the compound of the following formula

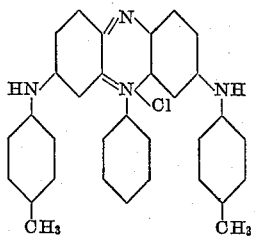

dissolving in concentrated sulfuric acid to a green solution, the color of which turns blue when diluted with water and from which solution there is precipitated, on addition of alkali, the dyestuff base soluble in ethylalcohol, ether and benzene to a blue solution.

12. As a new product, the compound of the following formula

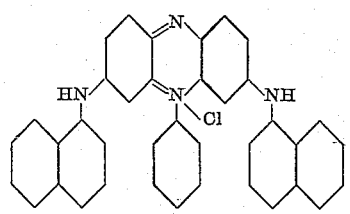

dissolving in concentrated sulfuric acid to a green solution, the color of which turns blue, when diluted with water and from which solution there is precipitated, on addition of alkali, the dyestuff base soluble in ethylalcohol, ether and benzene to a blue solution.

13. As a new product, the compound of the following formula

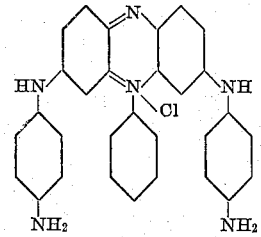

dissolving in concentrated sulfuric acid to a green solution, the color of which turns blue, when diluted with water and from which solution there is precipitated, on addition of alkali, the dyestuff base soluble in ethylalcohol, ether and benzene to a blue solution and being tetrazotisable in an acid solution.

In testimony whereof, I affix my signature.
FRITZ HESS.